(12) United States Patent
Zboril

(10) Patent No.: US 6,977,943 B2
(45) Date of Patent: Dec. 20, 2005

(54) METHOD AND SYSTEM FOR TRAFFIC MANAGEMENT IN PACKET NETWORKS USING RANDOM EARLY MARKING

(75) Inventor: Thomas George Zboril, Stittsville (CA)

(73) Assignee: Tropic Networks Inc., Kanata (CA)

( * ) Notice: Subject to any disclaimer, the term of this patent is extended or adjusted under 35 U.S.C. 154(b) by 919 days.

(21) Appl. No.: 09/969,785

(22) Filed: Oct. 4, 2001

(65) Prior Publication Data

US 2003/0067878 A1 Apr. 10, 2003

(51) Int. Cl.[7] .............................................. H04L 12/54
(52) U.S. Cl. ..................................... 370/429; 370/229
(58) Field of Search ............................... 370/229, 231, 370/232, 235, 252, 253, 358, 373, 235.1, 370/377, 384, 385, 386, 388, 395.4, 290, 370/360, 363, 368, 371, 374, 378, 381, 389, 370/396, 398, 400, 411, 413, 419, 428, 429

(56) References Cited

U.S. PATENT DOCUMENTS

| | | | |
|---|---|---|---|
| 6,252,848 B1 * | 6/2001 | Skirmont | 370/229 |
| 6,333,917 B1 * | 12/2001 | Lyon et al. | 370/236 |
| 6,646,988 B1 * | 11/2003 | Nandy et al. | 370/235 |
| 6,690,645 B1 * | 2/2004 | Aweya et al. | 370/230 |

OTHER PUBLICATIONS

Floyd, S., et al, "Random Early Detection Gateways for Congestion Avoidance", Lawrence Berkeley Laboratory, University of California ("to appear in the Aug. 1993 IEEE/ACM Transactions on Networking").

RFC 2309 (ietf draft) dated Apr. 1998, Braden, et al, "Recommendations on Queue Management and Congestion Avoidance in the Internet".

The ATM Forum Technical Committee, Traffic Management Specification Version 4.0, af-tm-0056.000, Apr. 1996.

Bodin, et al, "Load-tolerant Differentiation with Active Queue Management", published in Computer Communications Review, a technical letter for SICCOMM in Jul. 2000 at http://www.acm.org/sigcomm/ccr/archive/2000/july00/bodin.pdf.

Lin, et al, "Dynamics of Random Early Detection", published by MIT Lab for Computer Science, Parallel & Distributed Operating Systems Group at http://www.pdos.lcs.mit.edu/~rtm/papers/fred.pdf.

* cited by examiner

*Primary Examiner*—Brenda Pham
(74) *Attorney, Agent, or Firm*—Victoria Donnelly

(57) ABSTRACT

The invention describes a method for traffic management in a packet network using random early marking. For each packet flow, packets are randomly marked at the ingress of the network, while discard of the packets at the egress of the network is performed deterministically, i.e. in accordance with the predetermined rules. The step of random marking includes measuring parameters of the data flow, calculating marking probability by applying a mathematical function to the measured parameters, and generating a mark by applying a random logic function to the calculated marking probability. The packets are dropped at the egress of the network if the corresponding queues where the packets have to be stored are congested or full. A corresponding system for traffic management in packet networks is also provided.

4 Claims, 5 Drawing Sheets

METHOD AND SYSTEM FOR TRAFFIC MANAGEMENT IN PACKET NETWORKS USING RANDOM EARLY MARKING

FIELD OF THE INVENTION

The invention relates to method and system for traffic management in a packet network, and in particular, to the method and system for traffic management in a packet network using random early marking.

BACKGROUND OF THE INVENTION

Packet networks such as the Internet carry large volume and variety of digital data traffic nowadays. Typically, different flows of traffic enter a network at a number of inlets, being further directed to a number of outlets, where a queue placed at the network outlet may receive data from several inlets. As long as the data rate into the queue, which is the combined incoming traffic from all flows directed to the queue, does not exceed the egress rate from the queue, the queue remains empty. The queue fills up when the incoming traffic exceeds an egress rate, and the purpose of the queue is to absorb such higher rates, which occur for short periods of time as a result of the statistical variations of the packet traffic in the network.

Packets are lost when the queue overflows. A simple method by which network congestion could be managed is to allow queues to overflow and rely on the network users to reduce their rate of traffic as a response to the loss of packets. Unfortunately, this approach to data flow management, typically used in so-called end-to-end protocols such as the commonly used Transmission Control Protocol (TCP), is not adequate to control network congestion fairly and efficiently.

A more advanced congestion control method is found in RED (Random Early Discard, also variously named Random Early Detection) in which packets are dropped randomly before the queue is full. Internet Engineering Task Force (IETF) document entitled RFC (Request For Comment) 2309 "Recommendations on Queue Management and Congestion Avoidance in the Internet" published in April 1998, provides a discussion of said undesirable effects, which happen during the network congestion, with regard to the TCP protocol, and a brief description of the RED method. In more detail, a simple RED method uses the concept of a drop probability, which is derived from the average queue fill level. When the average queue fill level is less than the lower threshold (minimum), the drop probability is considered to be zero. When the average queue fill level is higher than the upper threshold (maximum), the drop probability is considered to be one. When the average queue fill level is between the minimum and maximum, the drop probability is interpolated between 0 and 1. Packets arriving at the queue are dropped according to the drop probability.

The simple RED method as described above has a number of shortcomings, most notable of which is that the decisions in traffic management in RED are made without regard to the flow rate and/or characteristics, which causes unfairness of the decisions made for flows having different rates and characteristics.

Improvements and extensions to the simple RED method have been proposed, for example in an article by Dong Lin and Robert Morris, "Dynamics of Random Early Detection" published by MIT Lab for Computer Science, Parallel & Distributed Operating Systems Group at http://www.p-dos.lcs.mit.edu/~rtm/papers/fred.pdf, where FRED (Flow-based RED) method has been described; and in an article by Ulf Bodin et al., "Load-tolerant Differentiation with Active Queue Management" published in Computer Communications Review, a technical letter for SIGCOMM, in July 2000 at http://www.acm.org/sigcomm/ccr/archive/2000/july00/bodin.pdf, where WRED (Weighted RED) method has been described. In FRED, drop probabilities are maintained separately for all flows present in the queue, while WRED uses Internet Protocol (IP) precedence of each packet to modify the drop probability.

Yet another modification of the RED method is described in the U.S. Pat. No. 6,252,848 to Skirmont entitled "System performance in a data network through queue management based on ingress rate monitoring", which uses ingress flow measurements and flow profiles to modify the drop probability.

All RED methods, including advanced derivatives thereof cited above, require increasingly complex computational power at each egress queue to evaluate the drop probability, which may not be acceptable in some situations. For example, in a network having multiple switches, where queues at the outlets of the switches require congestion management, multiple performing of RED or its modifications would result in the multiple performing of time consuming computational processing, which significantly increases the cost of a large network and may cause unnecessary delay in other operations of the system.

Therefore there is a need in industry for the development of such a system and method for traffic management in a packet network, which would avoid the above-mentioned drawbacks.

SUMMARY OF THE INVENTION

It is therefore an objective of the present invention to provide a system and method for traffic management in a packet network, which would be efficient while not requiring substantial computational power for providing congestion management.

According to one aspect of the invention there is provided a method for traffic management in a packet network, the method comprising the steps of:
(a) randomly marking a packet at the ingress of the network; and
(b) deterministically discarding the marked packet at the egress of the network.

Accordingly, the steps (a) to (b) are repeated the required number of times, e.g. performing random marking of incoming packets and simple discard of some of the marked packet at the egress of the network. Advantageously, the step of random marking comprises:
  introducing a measure of the flow at the ingress of the network;
  calculating a marking probability based on said measure of the flow; and
  randomly generating a mark based on the calculated probability for marking the packet.

Conveniently, the step of introducing the measure of the flow may comprise determining one or more parameters of the flow, e.g. packet rate or bit rate. Beneficially, the step of introducing the measure of the flow comprises monitoring flow characteristics in accordance with a "leaky bucket" method. The step of calculating the marking probability may comprise the step of applying a mathematical function to said measure of the flow, and the step of randomly generating the mark may comprise applying a random logical function to the calculated marking probability. Thus, the generated mark has two outcomes, YES and NO, where a YES mark indicates those packets which can be dropped at the egress of the network. Advantageously, the method described above is applied to the TCP (Transmission Control Protocol) data flow, or any other flow having similar behavior, where a transmitter is capable of adjusting its rate in response to a packet loss in the flow between a source and destination.

Discard (dropping) of packets is performed deterministically, i.e. according to the predetermined rules, e.g. when an egress queue, where the packet is supposed to be stored, is congested or full.

According to another aspect of the invention, there is provided a system for traffic management in a packet network, comprising:
  means for randomly marking a packet at the ingress of the network; and
  means for deterministically discarding the marked packet at the egress of the network.

Advantageously, the means for marking further comprises:
  means for determining a measure of the flow at the ingress of the network;
  means for calculating a marking probability based on said measure of the flow; and
  means for randomly generating a mark based on the calculated probability for marking the packet.

Conveniently, the means for determining the measure of the flow comprises means for determining one or more parameters of the flow, e.g. packet rate or bit rate. Beneficially, the means for determining the measure of the flow comprises means for monitoring flow parameters in accordance with a "leaky bucket" method. Conveniently, the means for discarding comprises means for dropping the marked packet in response to a signal regarding a status of an egress queue where the marked packet is to be stored.

According to yet another aspect of the invention there is provided a system for traffic management in a packet network having a plurality of switching stages, the system comprising:
  means for randomly marking packets in each packet flow at the ingress of the network; and
  a plurality of means for deterministically discarding said marked packets in each packet flow after each switching stage and at the egress of the network.

Advantageously, the means for marking further comprises:
  means for determining a measure of the flow at the ingress of the network;
  means for calculating a marking probability based on said measure of the flow; and
  means for randomly generating a mark based on the calculated probability for marking the packet.

Beneficially, the means for discarding comprises means for dropping the marked packet in response to a signal regarding a status of a queue where the marked packet is to be stored.

According to yet another aspect of the invention there is provided a method for traffic management in a packet network having a plurality of switching stages, comprising the steps of:
  randomly marking packets for each packet flow at the ingress of the network; and
  deterministically discarding said marked packets for each packet flow after each switching stage and at the egress of the network.

The described system and method provide random marking of packets at the ingress of the network, and simple deterministic discard of the marked packets at the egress point, thus substantially simplifying the discarding process and reducing the required computational power, which is especially useful in situations where intensive congestion management has to be performed.

BRIEF DESCRIPTION OF THE DRAWINGS

The invention will now be described in greater detail with reference to the attached drawings, in which.

DETAILED DESCRIPTION OF THE PREFERRED EMBODIMENTS

Figure 1:
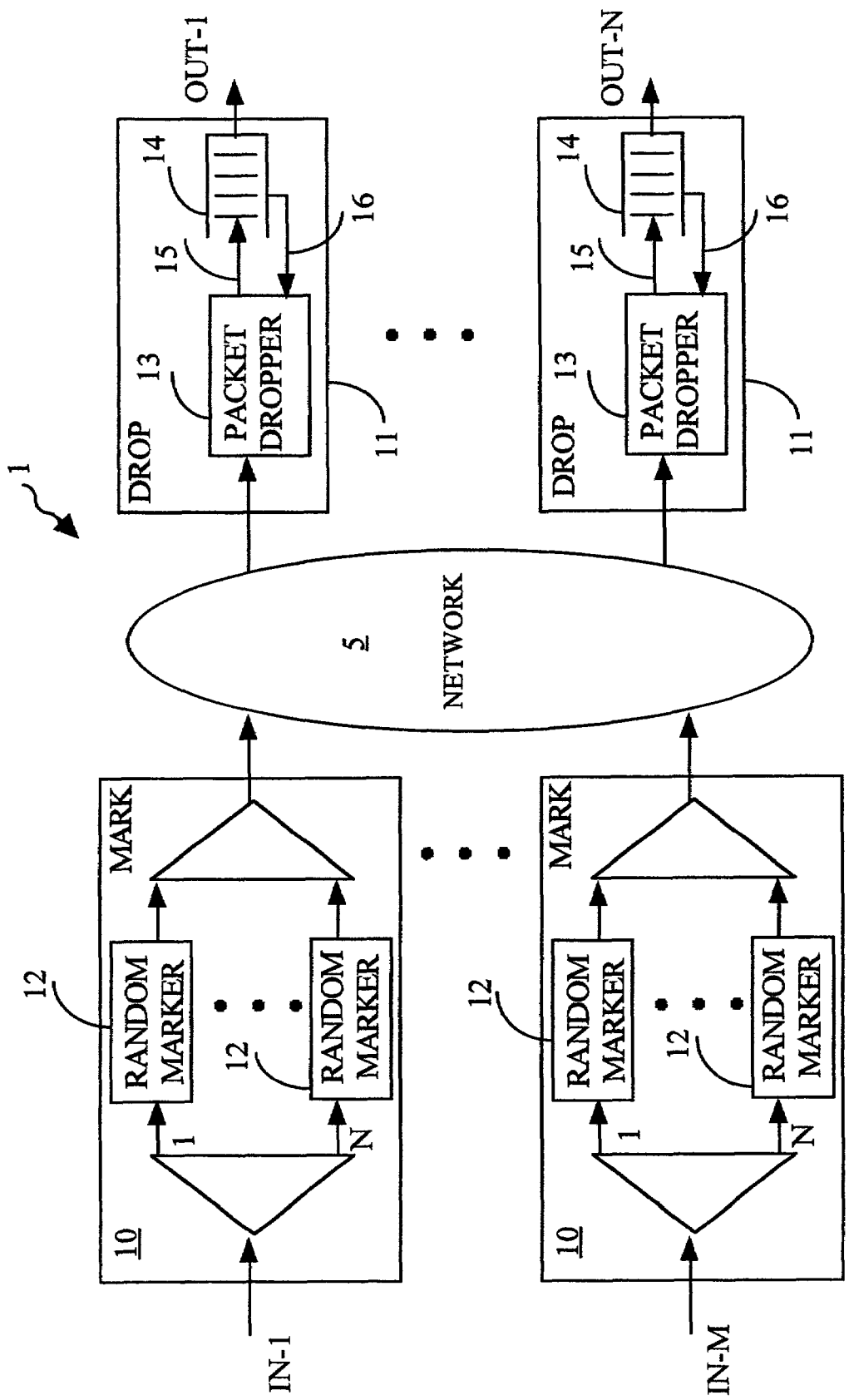
FIG. 1 is a block diagram illustrating a system for traffic management in accordance with a first embodiment of the invention.

A system 1 for traffic management in a packet network in accordance with the first embodiment of the invention is shown in FIG. 1. It includes a packet network 5, a number of "M" ingress processors 10 (blocks labeled "MARK") having corresponding inputs IN-1 to IN-M for receiving and marking data packets to be forwarded through the network 5, and a number of "N" egress units 11 (blocks labeled "DROP") for receiving the packets forwarded through the network, and for providing buffering and selective discard of the buffered packets. Thus, data packets are received at inputs IN-1 to IN-M of the ingress processors 10 and are destined for the outputs OUT-1 to OUT-N of the egress units 11. Each of the ingress processors 10 has "N" random markers 12, where packets are randomly marked, each random marker being responsible for those packets that are directed to one of the outputs OUT-1 to OUT-N. Correspondingly, each egress unit 11 has a packet dropper 13 for discard of the marked packets in accordance with the predetermined rules, and a number of egress queues 14, each having a queue buffer, for buffering the packets at the egress units 11.

The network 5 has "M" inlets corresponding to the number of inputs IN-1 to IN-M and receives data packets from said inputs through the input processors 10. The network 5 also has "IN" outlets corresponding to the number of outputs OUT-1 to OUT-N of the egress units 11, to which the packets are directed through the packet droppers 13 and the egress queues 14, each packet dropper 13 being connected to the corresponding egress queue 14 by packet link 15 and queue status link 16 as shown in FIG. 1.

A stream of packets, which arrive at one of the inputs IN-1 to IN-M, and are destined for one of the outputs OUT-1 to OUT N of the system, is commonly described as a flow. A flow may also be more narrowly defined, for example, it can be additionally differentiated based on Internet Protocol (IP) priority or IP protocol type. Each random marker 12 monitors said flow and marks each of the arriving packet with a drop eligibility flag (DEF) of 0 (no-drop) or 1 (may drop later).

Figure 2:
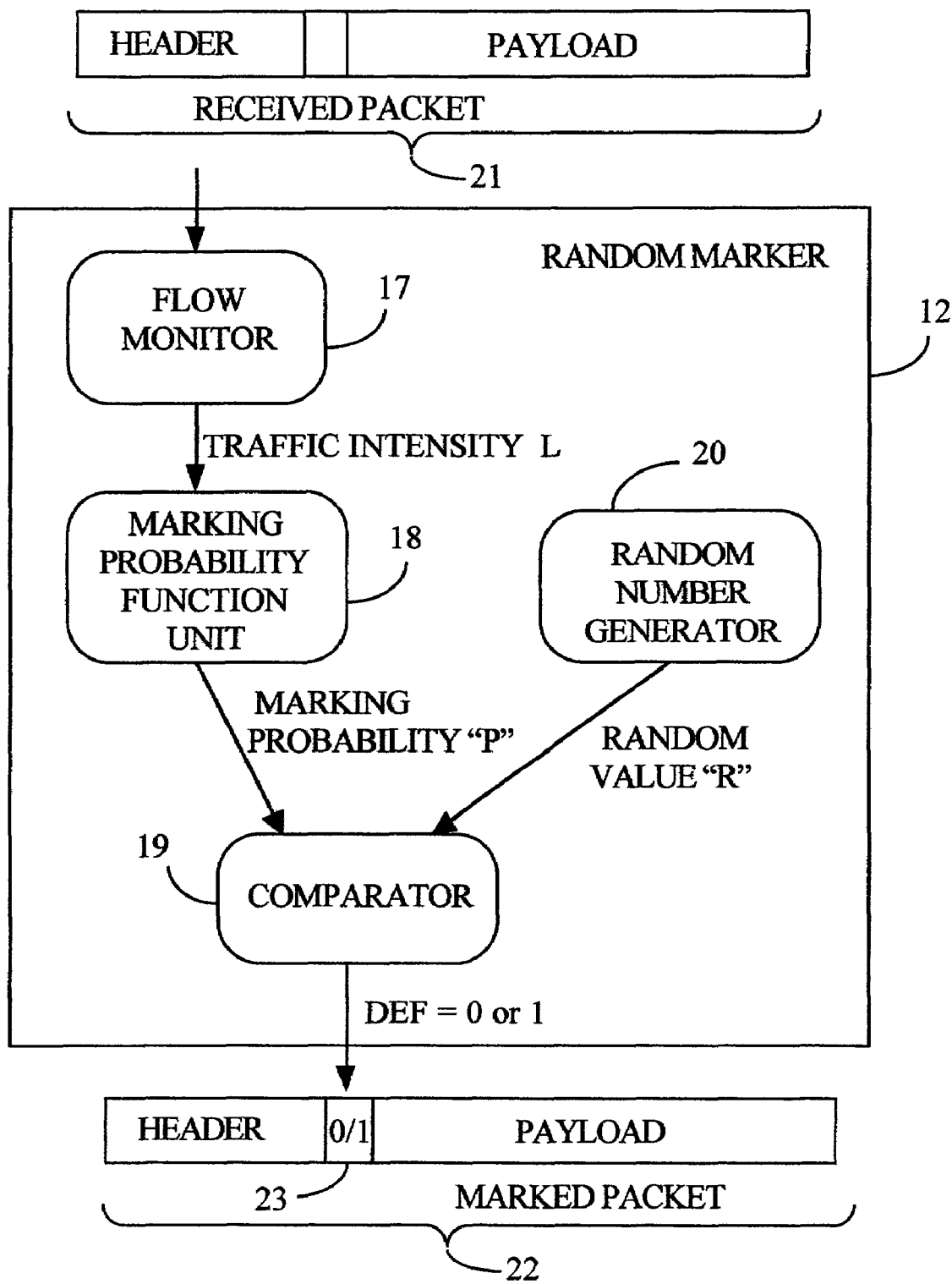
FIG. 2 is a block diagram of a random marker used in the system of FIG. 1.
Figure 3:
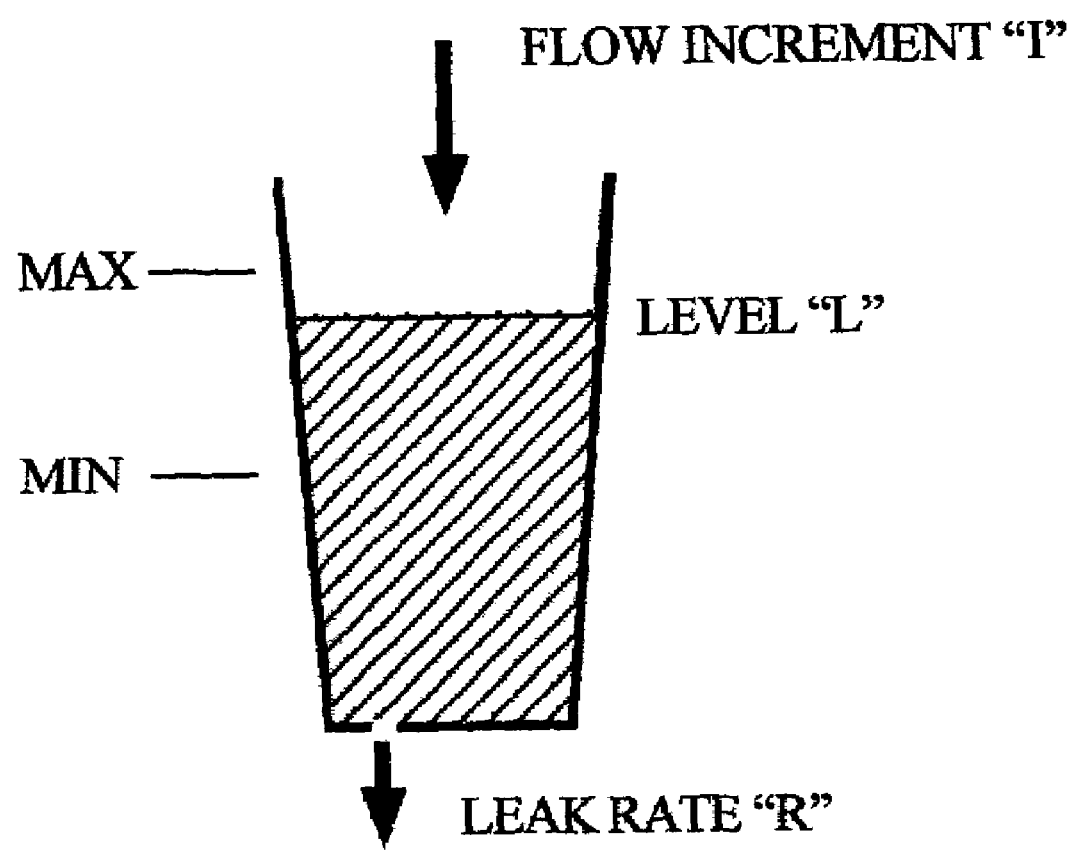
FIG. 3 is a diagram illustrating a traffic flow monitor according to a leaky bucket model of the prior art.

Structure and operation of the random marker 12 is illustrated in FIG. 2. It includes a flow monitor 17, marking probability function unit 18, random number generator 19 and a comparator 20. The flow monitor 17 receives the flow of packets, one of which is designated in FIG. 2 as packet 21, and estimates the traffic intensity of the flow. In the embodiment of the invention the flow monitor 18 is chosen to be operating in accordance with a leaky-bucket model of the prior art illustrated in FIG. 3. The leaky-bucket model includes as characteristic parameters a flow increment "I", a leak rate "R", and a level "L". As a packet is passed through the flow monitor 18, the level "L" is incremented by the flow increment "I". The level "L" is also decremented at each cycle by the leak rate "R". The values of the parameters "I" and "R" are determined to model the characteristics of the expected traffic, and the resulting level "L" is an estimate of the instantaneous traffic intensity of the flow. Also shown in FIG. 3 are two level thresholds "MIN" and "MAX" which are used by the random marker in the evaluation of the level "L". Other models, in addition to or instead of the leaky-bucket model may be used as components of a flow monitor 18 as described e.g. in ATM Forum Traffic Management Specification, Document No. af-tm-0056.000 version 4.0., published in April 1996. The traffic intensity L, estimated by the flow monitor 18 (level "L" of FIG. 3), is converted by a marking probability function unit 19 (FIG. 2) to a marking probability "P". When the traffic intensity is less than the lower threshold "MIN", the marking probability "P" is set to zero. When the traffic intensity is higher than the upper threshold "MAX", the marking probability "P" is set to one. When the traffic intensity is between "MIN" and "MAX", a marking probability is interpolated between 0 and 1. By comparing the marking probability "P" with a random value "R" in a comparator 20, the random value "R" being obtained from a random number generator 21, a Drop Eligibility Flag (DEF) is generated whose value is either 1 (drop later) with the probability of "P", or 0 (do not drop). This flag is inserted in each packet before it is forwarded to the network 5. The marked packet is designated in FIG. 2 by the reference numeral 22, with the inserted flag being correspondingly designated with the reference numeral 23.

Associated with each egress queue 14 (FIG. 1) is a packet dropper 13, which receives packets from the network 5 and forwards selected ones of said packets to the queue 14 over the packet link 15, while dropping all other packets. The decision whether to forward or drop the packet is made in the packet dropper 13 after determining the value of the DEF carried in the packet and the state of the egress queue 14 received over the queue status link 16.

Figure 4:
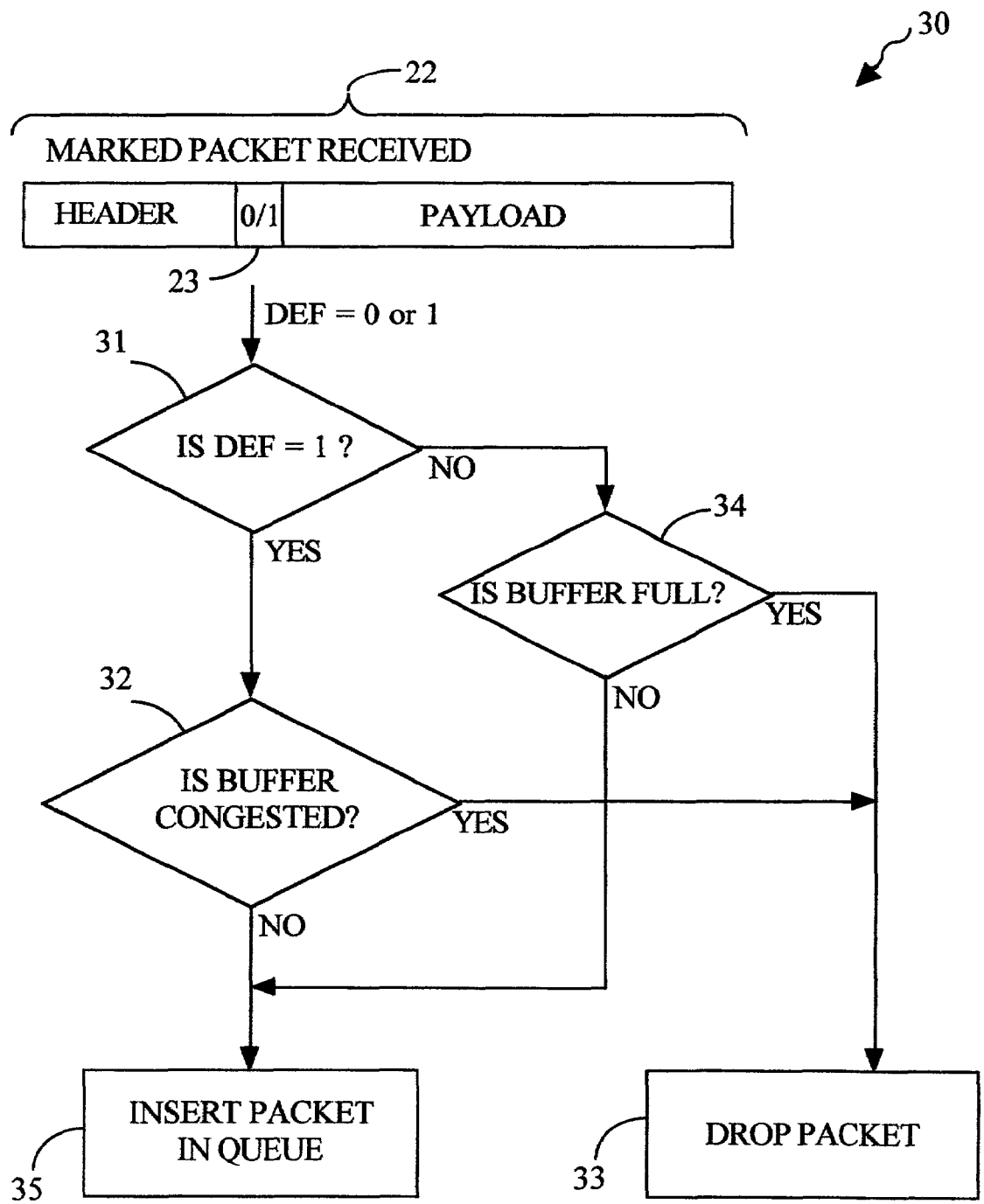
FIG. 4 is a flow chart illustrating operation of a packet dropper used in the system of FIG. 1.

Operation of the packet dropper 13 is described in more detail with the reference to the flow chart 30 of FIG. 4. Generally, the decision to drop the packet 22 is made after the determination of the value of the Drop Eligibility Flag (DEF) 23 in the received packet 22, and the state of the egress queue 14, wherein the state of the egress queue 14 is transmitted to the packet dropper 13 over the queue status link 16. As described above, the DEF can have two values, 0 or 1, and the state of the egress queue 14 indicates the fill level of the queue buffer. The queue buffer may be full if there is no space for additional packets, it may be congested if the fill level of the buffer is above a threshold, or it may neither congested nor full if the fill level of the buffer is below the threshold.

Operation of the packet dropper 13 starts with block 31, verifying whether DEF equals to unity, and if the answer is YES (DEF=1 in block 31), and if the buffer is congested (answer YES in block 32), then the packet is dropped (block 33). If the result of the test of block 31 "DEF=1?" is "NO", the packet is also dropped (block 33) if the buffer is full (answer YES in block 34). In all other cases, the packet is inserted in the queue (block 35).

While the first embodiment of the invention illustrates the system having a single network 5, where packets of a given traffic flow are marked by a random marker 12 and dropped or passed by a single packet dropper 13, depending on the value of the drop eligibility flag and the state of the egress queue 14, it will be appreciated that the network 5 of FIG. 1 may include a single switch or a network of switches, interconnected to as to form a larger network.

Figure 5:
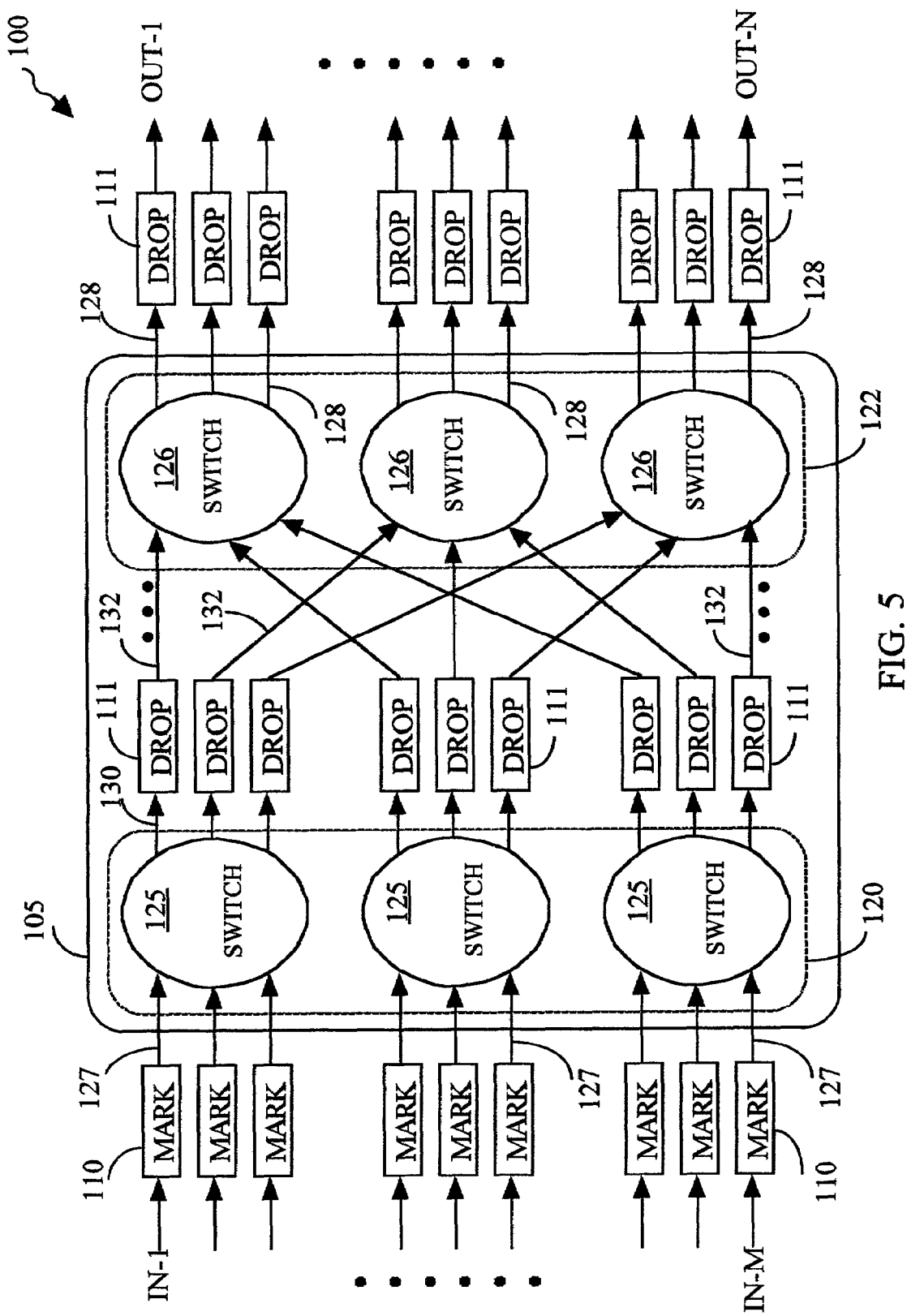
FIG. 5 is a block diagram illustrating a system for traffic management in accordance with a second embodiment of the invention.

FIG. 5 illustrates a system 100 for traffic management according to a second embodiment of the invention. It is similar to the system 1 of the first embodiment of FIG. 1 except for the network 5 now having a number of switching stages, and the links between the stages including corresponding egress units. Similar blocks in FIGS. 1 and 5 are designated by similar reference numerals incremented by 100 respectively. In more detail, the system 100 includes a packet network 105, a number of "M" ingress processors 110 (blocks labeled "MARK") having corresponding inputs IN-1 to IN-M for receiving data packets to be forwarded through the network 5, each processor having a random marker for random marking the received packets, and a number of "N" egress units 111 (blocks labeled "DROP") for providing buffering and selective discard of the packets forwarded through the network, each egress unit having a packet dropper. The network 105 has a number of switching stages interconnected so as to form a larger network, only two switching stages are illustrated in FIG. 5 as a first switching 120 and a second switching stage 122. The first and second switching stages 120 and 122 include a plurality of switches 125 and 126 respectively as shown in FIG. 5. Between each data input IN-1 to IN-M and the corresponding inlet 127 of the switch 125 of the first stage 120 is positioned an ingress processor 110, which performs the function of random marking for packet flows arriving at said input. For the sake of clarity, the details of the ingress processors 110 are not illustrated, and their random markers (not shown in FIG. 5) operate in accordance with the first preferred embodiment described above.

Between each outlet 128 of the last (second) switching stage 122 and corresponding data output OUT-1 to OUT-N of the system 100 is positioned an egress unit 111 similar to that of the first embodiment.

The links between the first switching stage 120 and the second switching stage 122 include additional egress units 111. Each egress unit 111 is connected to the outlet 130 of a switch 125 from the first stage 120 and the inlet 132 of a switch 126 from the second stage 122. Egress units 11 perform the same functions as described in the first embodiment by dropping marked packets when their buffers are congested.

It is contemplated that the interconnect scheme between the first and second switching stages 120 and 122 shown in FIG. 5 is merely illustrative, and that other network interconnections may be formed, e.g. more than two switching stages may be employed, with egress units inserted between the stages, and/or paths from the network input to the network output may pass through different number of switches.

The methods described in the first and second embodiments of the invention may be applied to any known type of data flow, being especially useful to TCP-like flows, including TCP (Transmission Control Protocol) flow, where a transmitter is capable of adjusting its rate based on the packet loss in the network between the source and destination.

Thus, the system and method for traffic management in a packet network are provided, in which a traffic measurement at the network ingress is used to generate a marking probability for each flow, and where randomly marked packets are dropped deterministically at congested egress queues, i.e. discarding being performed in accordance with predetermined set of rules. As a result, the congestion management would require reduced computational power and therefore would become more efficient in situations where multiple repetitions of the discard function have to be performed.

Although only a few exemplary embodiments of the invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A system for traffic management in a packet network having a plurality of switching stages, the system comprising:
    means for randomly marking packets in each packet flow, the means randomly marking comprising one random marker per packet flow at the ingress of the network; and
    a plurality of means for deterministically discarding said marked packets in each packet flow, the means for deterministically discarding comprising one or more deterministic packet droppers per each packet flow, the number of the deterministic packet droppers being less than or equal to the number of the switching stages, each packet dropper being disposed after a respective switching stage or at the egress of the network.

2. A system as described in claim 1, wherein the means for marking comprises:
    means for determining a measure of the flow at the ingress of the network;
    means for calculating a marking probability based on said measure of the flow; and
    means for randomly generating a mark based on the calculated probability for marking the packet.

3. A system as described in claim 1, wherein the means for discarding comprises means for dropping the marked packet in response to a signal regarding a status of a queue where the marked packet is to be stored.

4. A method for traffic management in a packet network having a plurality of switching stages, comprising the steps of:
    randomly marking packets at the ingress of the network so that packets for each packet flow are marked in one random marker at the ingress of the network associated with the packet flow; and
    for each packet flow, deterministically discarding said marked packets in one or more deterministric packet droppers, the number of deterministic packet droppers being less than or equal to the number of the switching stages, each packet dropper being disposed after a respective switching stage or at the egress of the network.

* * * * *